United States Patent [19]
Dugan et al.

[11] Patent Number: 5,398,858
[45] Date of Patent: Mar. 21, 1995

[54] WHISKER-REINFORCED CERAMIC ROLLER GUIDES

[76] Inventors: Tracy P. Dugan, 1152 Highway 357, Lyman, S.C. 29365; James H. Robertson, Jr., 1625 Ridgewood Blvd., Hendersonville, N.C. 28739

[21] Appl. No.: 748,925

[22] Filed: Aug. 23, 1991

[51] Int. Cl.⁶ .............................................. B65H 57/14
[52] U.S. Cl. ................................................ 226/190
[58] Field of Search ................. 226/190, 194; 29/123, 29/130, 129, 132; 384/419, 418, 907.1; 432/246

[56] References Cited

U.S. PATENT DOCUMENTS

| | | | |
|---|---|---|---|
| 1,541,410 | 6/1925 | Cowley | 384/419 |
| 1,872,062 | 8/1932 | Burke | 432/246 |
| 2,531,770 | 11/1950 | Ducharme | 384/419 X |
| 2,914,811 | 12/1959 | Cole et al. | 384/419 X |
| 3,274,504 | 2/1942 | Shepherd | 226/194 |
| 3,297,223 | 1/1967 | Bueker | 226/194 X |
| 3,401,541 | 9/1968 | Stevens, Jr. et al. | 226/194 X |
| 3,934,951 | 1/1976 | Stumpf | 384/419 |
| 4,122,985 | 10/1978 | Nelson | 226/194 X |
| 4,231,504 | 11/1980 | Ketzer | 226/194 X |
| 4,829,645 | 5/1989 | Kannwischer | 226/194 X |
| 4,840,763 | 6/1989 | Freitag | 264/65 |
| 4,961,757 | 10/1990 | Rhodes et al. | 501/89 X |

FOREIGN PATENT DOCUMENTS

| | | | |
|---|---|---|---|
| 2419677 | 11/1979 | France | 432/246 |
| 1135937 | 9/1962 | Germany | 432/246 |
| 61-36166 | 2/1986 | Japan . | |

Primary Examiner—Daniel P. Stodola
Assistant Examiner—John P. Darling
Attorney, Agent, or Firm—Banner, Birch, McKie & Beckett

[57] ABSTRACT

Roller guides made of a ceramic matrix reinforced with monocrystalline whiskers with a cylinder-and-post configuration exhibit long useful operating lives when guiding metallic wires, braids, or ribbons.

14 Claims, 4 Drawing Sheets

WHISKER-REINFORCED CERAMIC ROLLER GUIDES

FIELD OF THE INVENTION

The invention relates to whisker reinforced ceramic roller guides and their use for guiding metallic wires, braids or ribbons. Roller guides according to the invention are particularly useful for guiding round steel wires used in the manufacture of steel belts for tires.

BACKGROUND OF THE INVENTION

Steel belts for tires are made of a plurality (about 30) of round steel wires formed into plies which provide strength with flexibility to automotive tires. In their manufacture, the wires are provided in the form of large rolls which must be unwound and fed to the braiding machinery in a manner that does not reduce the strength of the wire or affect its straightness. The current practice is to apply a tension of about 10 lbs. to the wire and pass the wire through at least one assembly of rollers to guide the wires in parallel along the required path. The linear speed Of the wires is about 3 feet per second (0.9 m/s).

The rollers currently used are illustrated in FIG. 1. These rollers have a central shaft 1 passing through opening 2 in steel assembly frame 3. Nut 4 acts against flange 5 and washer 6 to hold the roller in frame 3 as a complete guide assembly. The rolling member of the roller is made of alumina tube 7 that rotates with the aid of two mechanical bearings 8. Bearings 8 are made of outer ring 9, outer-ring ball race 10, inner-ring ball race 11, inner ring 12, and ball bearing 13. Lubricant is typically used to lubricate the movement of ball bearing 13 in races 10 and 11.

Outer ring 9 and races 10, 11 are spaced apart from frame 3 by a distance, d, which is open to the atmosphere outside the roller. Through this space enters a significant quantity of air-borne dust and, importantly, scale and rust flakes from the surface of the wire being transported over the surface of the roller. After only about 2 months of use, the amount of accumulated dust, scale, and rust is sufficient to cause the bearings to seize. The roller stops rotating although the forces acting on the wire cause the wire to drag across the surface of alumina tube 7. From the friction, a groove is cut in the surface of the guide and the wire is flattened from the abrasion. Such damage to the wire reduces the wire strength and makes it more susceptible to kinks and bending.

The conventional rollers are removed from the roller frame with great difficulty due to the structure of the roller. A seized bearing 8 tightly holds the bearing to central shaft 1 so removal of nut 4 does not permit central shaft 1 to be extricated from frame 3. The roller must be cut in half through alumina tube 7 and central shaft 1. A hammer is used to sharer tube 7, and a cutting torch is used on central shaft 1. Removal of a single roller in an assembly takes at least 30 minutes by an experienced technician. In fact, the replacement process is of sufficient difficulty that most commercial facilities wait until several rollers require replacement before any are replaced. Wire quality suffers in the meantime.

It would be desirable to have a roller guide that was able to resist seizing due to accumulations of airborne dust as well as scale and rust coming from metal wire being guided by the rollers.

It would also be beneficial to have a roller guide structure that would permit rapid replacement of nonfunctional rollers without destruction of the roller elements.

SUMMARY OF THE INVENTION

It is an object of the invention to provide a roller guide exhibiting a physical structure in combination with a material of construction that does not have a ball bearing/race assembly to become seized.

It is another object of the invention to provide a roller guide and assembly that permits nonfunctioning rollers to be rapidly removed from the assembly and replaced without physical destruction of the roller elements.

It is a further object of the invention to provide a method for guiding metallic wires, braids, and ribbons with roller guides according to the invention.

In accordance with these and other objects of the invention which will become apparent from the description contained herein, roller guides according to the invention comprise:

a roller made from a material comprising a ceramic reinforced with monocrystalline whiskers selected from the group consisting of silicon carbide, alumina, aluminum nitride, beryllia, boron carbide, and silicon nitride, wherein said roller exhibits a cylindrical shape about a central axis and further exhibits a first end and a second end;

a first cap engaging said first end and a second cap for engaging said second end whereby the caps are made of the same material as said roller and exhibit a physical shape which permits said roller to freely rotate around said central axis.

Methods for guiding metallic wires, braids, and ribbons according to the invention comprise:

passing a metallic wire, braid, or ribbon over the freely rotating surface of a roller made from a material comprising a ceramic reinforced with monocrystalline whiskers selected from the group consisting of silicon carbide, alumina, aluminum nitride, beryllia, boron carbide, and silicon nitride, wherein said roller exhibits a cylindrical shape about a central axis and further exhibits a first end engaging a first cap and a second end engaging a second cap whereby the caps exhibit a physical shape which permits said roller to freely rotate around said central axis.

Roller guides and guiding methods according to the invention eliminate the use of mechanical bearings and the maintenance problems associated with bearing seizure due to the accumulation of airborne dust as well as scale and rust coming from the wire, braid, or ribbon being guided. The whiskers reinforce the ceramic elements thereby providing a high degree of structural integrity. In addition, the bearing contact surfaces on the roller guide are highly resistant to wear despite the fact that they are made of the same material. Dust or metallic particles entering into crevices between roller elements do not affect the free rotation of the roller.

DETAILED DESCRIPTION

Figure 1:
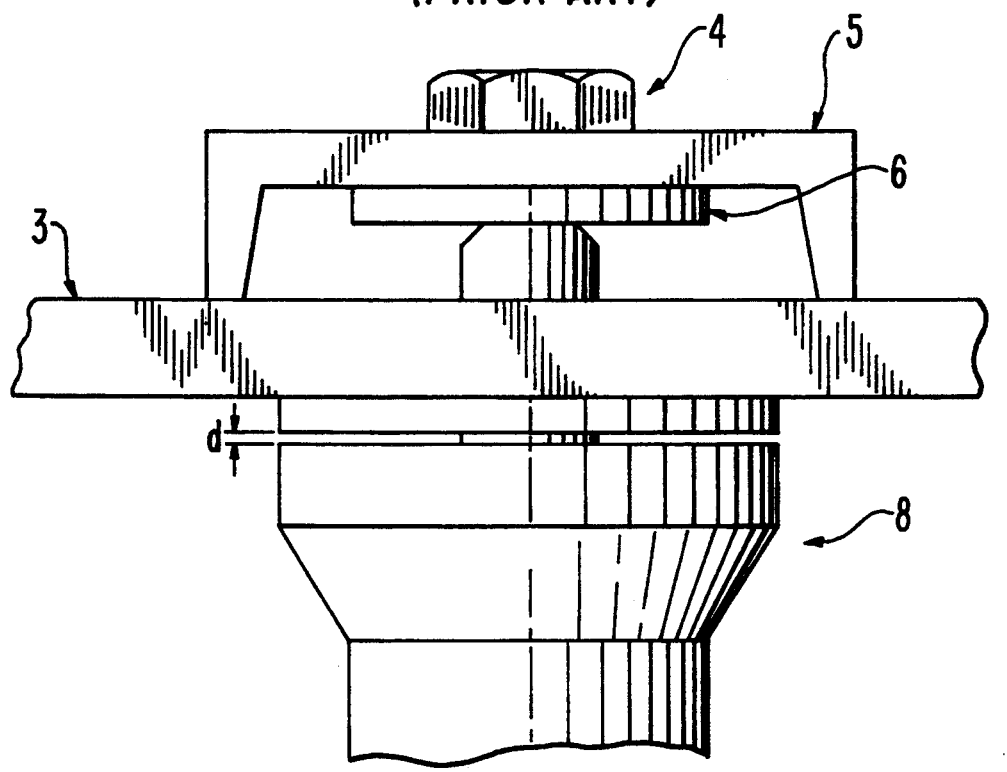
FIG. 1 depicts a prior art roller guide having ball bearing race assemblies.
Figure 1:
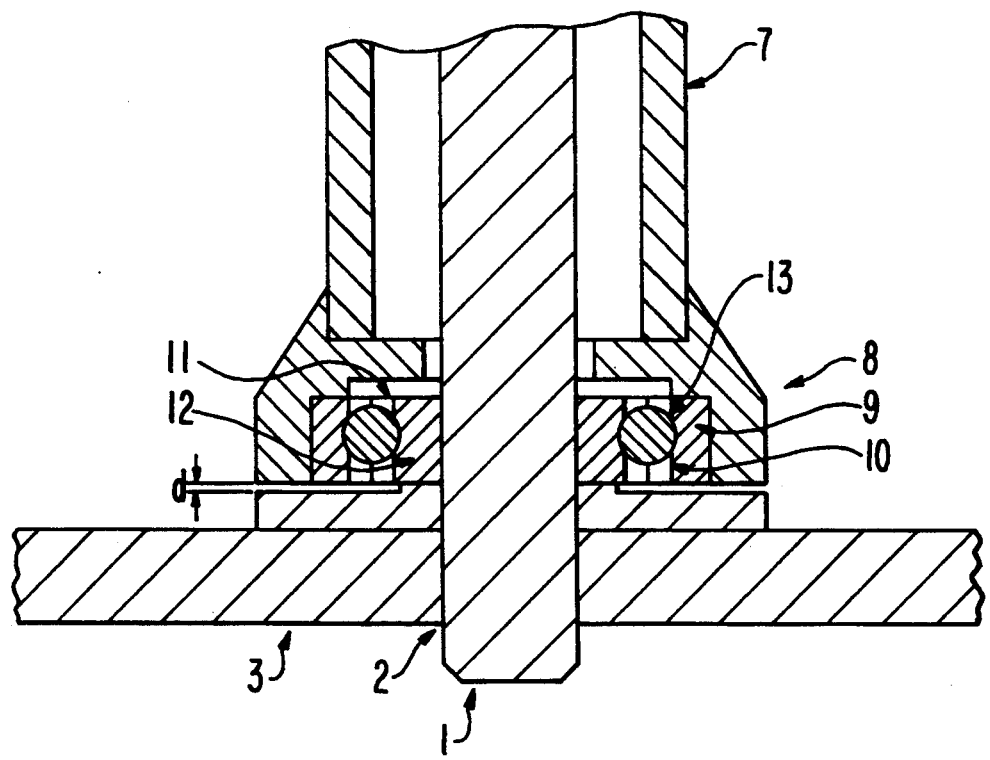

Roller guides according to the invention are made of a material comprising a ceramic matrix reinforced with 2-20 volume percent of monocrystalline whiskers selected from the group consisting of silicon carbide, boron carbide, titanium carbide, alumina, aluminum nitride, SiN, TIN, and beryllia either alone or in admixture. The preferred quantity of whiskers is within the range from about 4-12 vol %, most preferably 5-11 vol %. Ceramic materials useful as matrices for roller guides include alumina and silicon nitride. Alma is preferred with a particular preference for fine-grained alumina having an average particle size of less than 1 micron, preferably about 0.4-0.6 microns.

The preferred whiskers are silicon carbide whiskers exhibiting the beta form. These whiskers are produced from rice hulls and have an average diameter on the order of 0.6 microns and aspect ratios within the range from about 15 to about 150. These whiskers have strengths of about 70,000 kg/cm$^2$ and a tensile modulus of about 4-7 million kg/cm$^2$. Whiskers described in U.S. Pat. No. 4,961,757 may be used for the present invention, the entire description of that patent being herein incorporated by reference.

Ceramics useful as the matrix material for the present invention include alumina and silicon nitride optionally with minor amounts (i.e., up to about 30% and preferably less than about 10%) of one or more toughening components such as zirconia, yttria, hafnia, magnesia, silicon nitride, titanium carbide, or mixtures thereof. Conventional sintering aids may be used to facilitate the efficiency of the sintering process whether or not toughening agents are included in the matrix. The preferred matrix material is alumina.

The monocrystalline whiskers may be mixed with the ceramic matrix and additive materials by any technique which thoroughly disperses the whiskers in the mixture without unduly reducing the ratio of the whisker length to the whisker diameter, sometimes known as the "axial ratio." Agglomerates of whiskers may be avoided by use of a polar solvent to aid in the dispersion of the whiskers in the powdered matrix material as in U.S. Pat. No. 4,463,508. The preferred method of blending is with a ball mill.

Once the matrix powder, the whiskers, and any additives are formed into a thoroughly dispersed blend, the blend is shaped and presintered by any of the conventional methods. Axial pressing in an appropriately shaped mold at room temperature with pressures of about 15-25 ksi, extrusion, and injection molding are all examples of suitable processes which will produce a green product having a density of 50-70% theoretical.

The green product is then sintered to produce a product of 95-100% theoretical density, preferably 96% or higher. Sintering processes that are useful for the present invention include cold sintering at 1550°-1700° C. for 95-98% density, hot sintering at 1700°-1850° C. for 97-100% density, and hot isostatic pressing (HIP) at 1700°-1850° C. for 98-100% density based on the theoretical maximum. Cold sintering is the preferred sintering process for the present invention primarily due to the lower processing costs associated with the process.

The sintered product is usually machined or ground to the final dimensions and tolerances. This machining is carried out in the manner conventional for ceramics by using wheels of diamond grit with sizes from 60-600 grit, preferably 150-180 grit.

Materials that can be guided with whisker-reinforced rollers include metal wires, braids, or ribbons as well as virtually any other continuous or filamentary material that is sufficiently hard to pose a risk of abrasion to the roller if the roller seizes or if the material must travel through chemically harsh environments. Rollers of the present invention can be used to guide copper, aluminum, and virtually any other type of metal or metal alloy. The present guides are particularly useful for guiding iron-based wires such as steel wires that are used in the manufacture of steel belts for vehicle tires. The hard ceramic is quite resistant to the abrasive effects of scale and flakes coming from the wire. The high temperature stability of the present rollers also permits the use of the rollers for guiding glass filaments or fibers such a optical fiber.

Roller guides according to the invention are conveniently explained with reference to the attached figures. Elements having the same function are designated with the same reference number.

Figure 2:
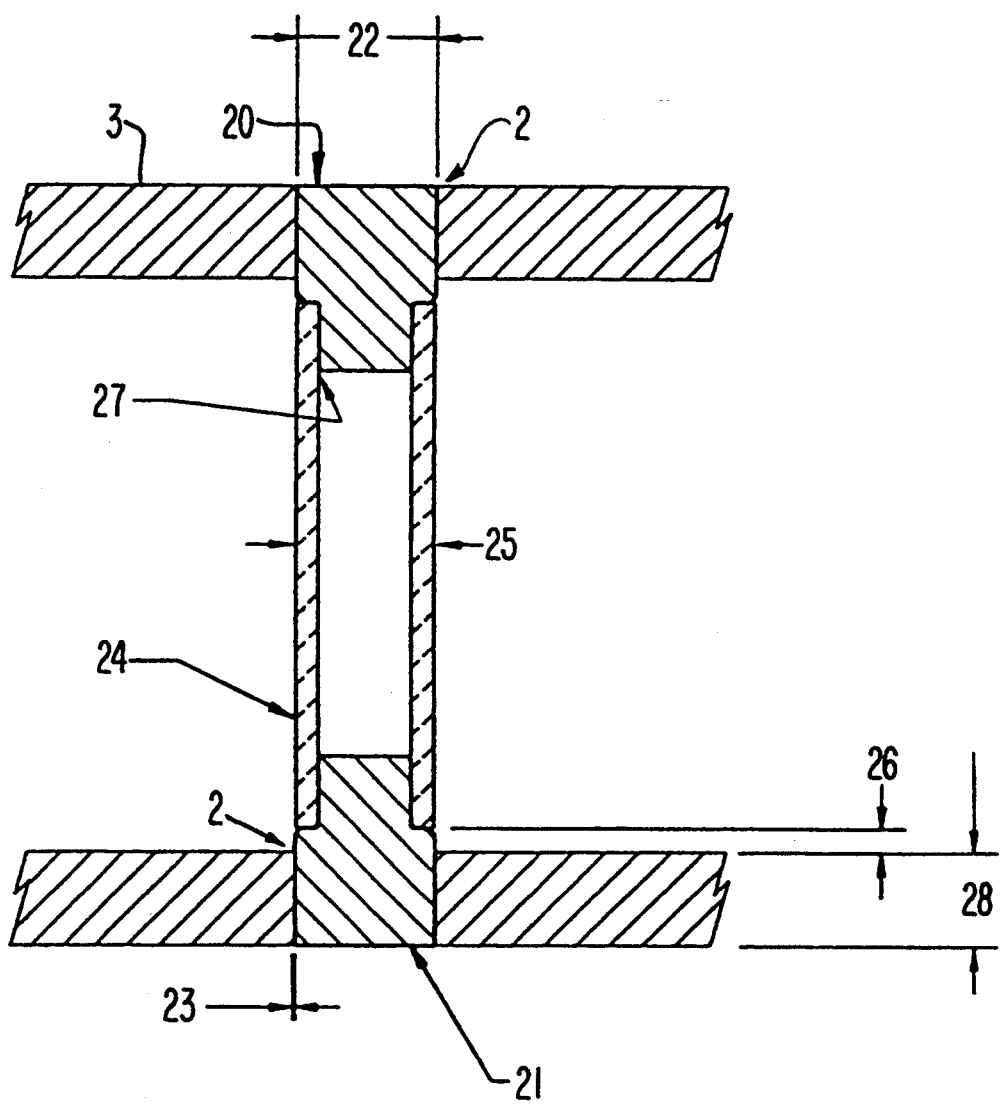
FIG. 2 shows a roller guide according to the invention inserted into a frame assembly.
Figure 3:
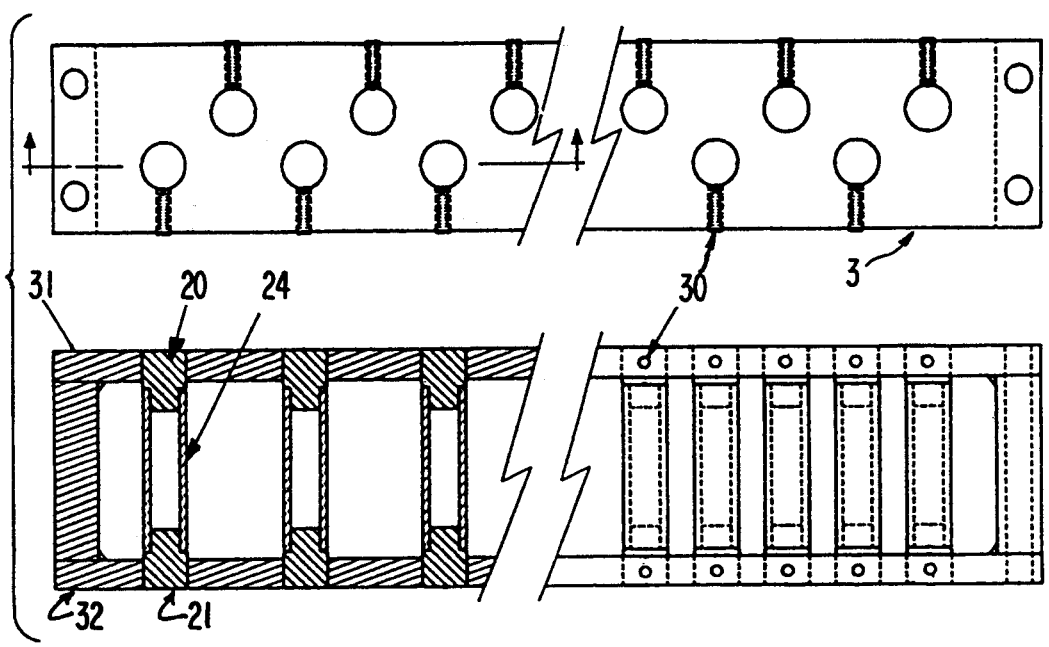
FIG. 3 illustrates top and side views of a frame assembly with a plurality of guides.

In FIG. 2, frame 3 may be the frame used with the prior art roller guides illustrated in FIG. 1. The present roller guides are, therefore, able to be retrofit an existing guide line with minimal modification. The only modification required of the conventional roller frames is the addition of a tapped hole for set screws 30 in the top and bottom members 31, 32 of frame 3 (FIG. 3). This set screw will act against end caps 20 and 21 respectively and hold the roller in place during use. Removal of the roller is accomplished in the most convenient manner by loosening the bottom set screw and allowing bottom end cap 21 and tube 24 (depending on the diameter of tube 24) to fall out of frame 3. Reassembly occurs in the reverse order. In the event wear requires the replacement of end cap 20, the top set screw may also be loosened so the whole roller assembly is removed simultaneously.

Tube 24 exhibits a cylindrical shape about a central axis and further exhibits a first end engaging a first cap and a second end engaging a second cap whereby the caps exhibit a physical shape which permits said roller to freely rotate around said central axis. This rotation occurs without the use of mechanical bearings or the need for externally added lubrication. If desired, dry lubricants (such as boric acid) may be used although such lubricants are not necessarily required.

When the end caps and the roller are made of the same material, their hardnesses are the same. When such a situation occurs with metals rather than with reinforced ceramics according to the present invention, the parts seize. For the present invention, however, the end caps and the roller tube freely rotate subject only to the frictional forces between the bearing surface area between the end caps and the roller tube. By appropriate modifications of the bearing surface area that is well within the existing skill of the art, the bearing surface area can be modified to correspond to the desired degree of resistance for the particular process. Such resistance can be chosen to correspond to selective drawing of the material being guided by the roller bearings.

The preferred shape of guides according to the invention is a cylinder-and-post configuration. This provides the ability for first end cap 20 and second end cap 21 to be readily sized to fit diameter 22 of holes 2 which previously held central shaft 1 as a retrofit part. The clearance 23 between frame 3 and caps 20, 21 will be sufficient to allow removal of one or more of the caps for replacement of alumina tube 24. Suitable clearances are within the range from about 0.001 to about 0.005 inches (0.025–0.13 mm) with the preferred clearances being 0.002–0.003 inches (0.051–0.076 mm). The diameter 25 of tube 24 is conveniently smaller than diameter 22 to allow tube 24 m be removed through hole 2 when end cap 21 is removed.

Figure 5:
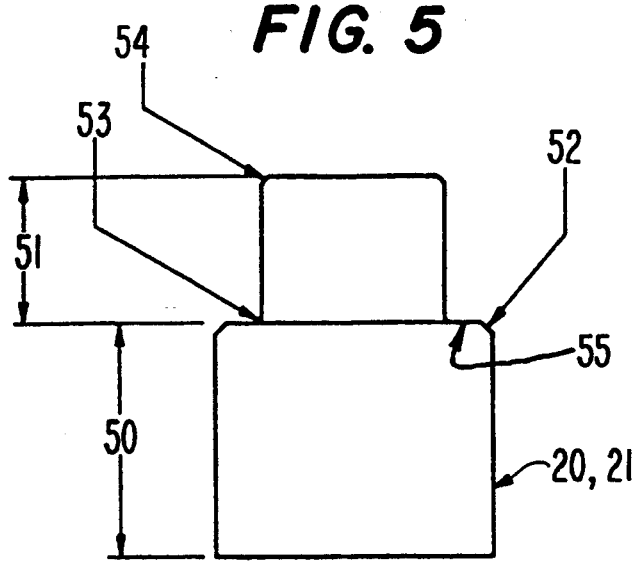
FIG. 5 depicts the shape of an end cap for roller guides according to the invention.
Figure 6:
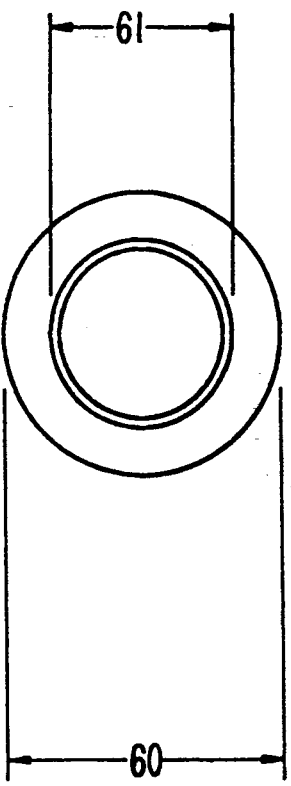
FIG. 6 is a top view of an end cap according to the invention.

Additional details regarding end caps 20 and 21 are shown in FIGS. 5 and 6. End caps 20, 21 are characterized by a first portion 50 of a first diameter 60 and a second portion 51 with a smaller, second diameter 61. The length of second portion 51 can be shortened to reduce friction during the rotation of tube 24 or lengthened to increase the friction. For a tube 24 length of about 1 inch, portion 51 can be about 0.25 to about 0.5 inches.

First portion 50 is preferably longer than the thickness 28 of frame 3 whereby portion 50 extends beyond frame 3 by a distance 26 (FIG. 1). First diameter 60 is slightly smaller than diameter 22 in frame 3 (FIG. 2) to allow removal of the end cap through the opening in frame 3 for maintenance. Shoulder 55 is formed by the step reduction in diameter from portion 50 to portion 51. Interior edges 52, 53, and 54 are preferably chamfered or rounded to avoid regions that might be susceptible to cracking or chipping as tube 24 rotates in contact with these surfaces. The corresponding contact surfaces on tube 24 are similarly chamfered or rounded.

The clearance 27 between end caps 20, 21 and the inside diameter of tube 24 is sufficient to allow tube 24 to rotate freely without the use of mechanical, spherical bearings, race assemblies, or external lubrication. Clearances are preferably within about 0.001 inches to about 0.010 inches (0.025–0.25 mm), preferably 0.004–0.008 inches (0.1–0.2 mm). The hardness of the present materials is sufficient to permit extended rotation without significant wear on either the bearing or guiding surfaces at the linear speeds commonly used for guiding metallic wires, braids, or ribbons.

The embodiment shown in the figures uses a hollow cylinder as the rotation tube and solid cylinders with shoulders for end caps. Although not illustrated, the present invention is equally applicable to the embodiment where the rotation tube is a solid cylinder with a first diameter through the wire contact area and a reduced diameter with shoulders at either end. The end caps would, therefore, be hollow cylinders but operate similarly.

In operation of the depicted embodiment, the guided material contacts tube 24 thereby causing tube 24 to rotate about the central axis defined by end caps 20 and 21. As shown in FIG. 3, a plurality roller guides can be positioned in frame 3 to act as guides for many wires, braids or ribbons. If, as shown, the guides are staggered in position within frame 3, set screws 30 may be positioned on either side of frame 3. This positioning will allow more room for access to the set screws for maintenance. In fact, all 30 rollers were replaced in about 3 minutes as opposed to about 30 minutes per maintenance cycle with the conventional central shaft/mechanical bearing assemblies. This reduction in maintenance time represents a significant economic savings.

Figure 4:
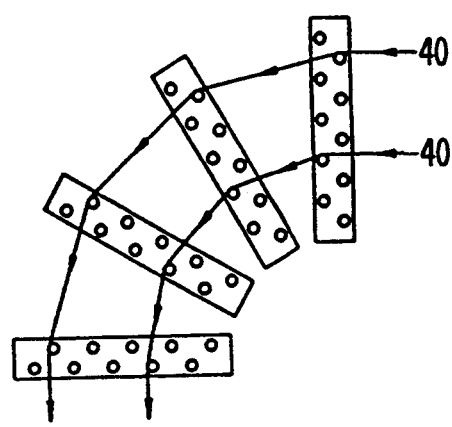
FIG. 4 is the use of several guides to allow guided material to turn a corner.

Several assemblies may be used in combination to guide the wires, braids, or ribbons around virtually any turn or angle. FIG. 4 shows the use of four assembles to guide steel wires 40 around a right angle corner.

EXAMPLE

Thirty total rollers were divided into 4 groups having clearances between the inside diameter of the roller and the outside diameter of the end caps of 0.002 inches, 0.004 inches, 0.006 inches, and 0.008 inches. The rollers were made according to the invention by thoroughly dispersing 7 volume % monocrystalline silicon carbide whiskers with a ball mill in a mixture of high purity alumina (99.95%) having a surface area of 7.4 $m^2/g$ and a median particle size of 0.36 microns. Less than 1 volume % of yttria and magnesia were used as sintering aids. Polyvinyl alcohol as a consumable binder was added in sufficient quantity (in the range of 3–6%) to hold the shape of the material after pressing. The final blend was placed into a mold approximating the shape of the final roller and isostatically pressed at room temperature.

The pressing was performed by placing the final blend into a rubber mold having the desired shape. The mold was then placed into a pressurizable chamber of liquid. A pressure of about 20 ksi is applied for about 20 minutes until the green form product is at a density of about 62% theoretical.

The green form product is cold sintered at a temperature of about 1600° C. under a nitrogen atmosphere for about 24 hours and then permitted to cool slowly to room temperature. The sintered product had a density of 96% of theoretical and was ground to shape with a 125 grit diamond wheel.

In this example, the roller was a hollow cylinder, and the end caps were cylindrical with a step reduction in diameter to fit inside the roller. Accordingly, the outside diameter of the end cap exhibiting the reduced diameter and the shoulder formed by the step reduction are the friction surfaces on each of the end caps. The interior diameter at each end of the central roller and the end portion corresponding to the thickness of the roller were the bearing surfaces on the roller.

These rollers were mounted vertically into a frame previously used for conventional steel shafted guides having mechanical bearings in a pair of races. The frame was modified slightly by adding a tapped hole for securing the end cap of each roller inside the frame.

All 30 rollers are currently rotating freely after 12 weeks of use in guiding steel wires used in the manufacture of steel belts for automobile tires. None is experiencing any significant sign of wear. Conventional roller guides under the same conditions have lasted on average only about 8 weeks before seizing due to bearing difficulties.

It will be understood that the foregoing figures and examples are included to facilitate an understanding of the invention. Specific dimensions and materials are not intended to act as a limitation on the scope of the following claims.

We claim:

1. Roller guides comprising
   a roller made from a material comprising a ceramic reinforced with monocrystalline whiskers selected from the group consisting of silicon carbide, alumina, aluminum nitride, beryllia, boron carbide, and silicon nitride, wherein said roller exhibits a cylindrical shape about a central axis and further exhibits a first end and a second end;

a first cap engaging said first end and a second cap for engaging said second end whereby the caps are made of the same material as said roller and exhibit a physical shape which permits said roller to freely rotate around said central axis.

2. A roller guide according to claim 1 wherein said ceramic comprises alumina.

3. A roller guide according to claim 2 wherein said ceramic further comprises a sintering aid.

4. A roller guide according to claim 1 wherein said whiskers consist essentially of silicon carbide.

5. A roller guide according to claim 1 wherein said roller comprises 2–20 volume percent whiskers.

6. A roller guide according to claim 5 wherein said roller comprises 5–11 volume percent whiskers.

7. A roller guide according to claim 1 wherein:

said roller exhibits the shape of a hollow cylinder with an inside diameter and an outside diameter; and the end caps each exhibit the shape of a rod having a first portion with a first diameter and a second portion with a second diameter smaller than said first diameter whereby said second diameter is slightly smaller than the inside diameter of said roller and allows said roller to rotate freely without mechanical bearings.

8. A roller guide assembly comprising a plurality of roller guides each of which comprises:

a roller made from a material comprising a ceramic reinforced with monocrystalline whiskers selected from the group consisting of silicon carbide, alumina, aluminum nitride, beryllia, boron carbide, and silicon nitride, wherein said roller exhibits a cylindrical shape about a central axis and further exhibits a first end and a second end;

a first cap engaging said first end and a second cap for engaging said second end whereby the caps are made of the same material as said roller and exhibit a physical shape which permits said roller to freely rotate around said central axis.

9. A method for guiding continuous materials which comprises:

passing a continuous material over the freely rotating surface of a roller made from a material comprising a ceramic reinforced with monocrystalline whiskers selected from the group consisting of silicon carbide, alumina, aluminum nitride, beryllia, boron carbide, and silicon nitride, wherein said roller exhibits a cylindrical shape about a central axis and further exhibits a first end engaging a first cap and a second end engaging a second cap whereby the caps exhibit a physical shape which permits said roller to freely rotate around said central axis.

10. A method according to claim 9 wherein the continuous material comprises a metallic wire and the passing step comprises:

passing a metallic wire over the surface of a roller made from a material comprising an alumina matrix.

11. A method according to claim 9 wherein the continuous material comprises a metallic wire and the passing step comprises:

passing a metallic wire over the surface of a roller made from a material comprising silicon carbide whiskers.

12. A method according to claim 9 wherein the continuous material comprises a metallic braid and the passing step comprises:

passing a metallic braid over the surface of a roller made from a material comprising an alumina matrix having silicon carbide whiskers dispersed therein.

13. A method according to claim 9 wherein the continuous material comprises a metallic ribbon and the passing step comprises:

passing a metallic ribbon over the surface of a roller made from a material comprising an alumina matrix having silicon carbide whiskers dispersed therein.

14. A method according to claim 9 wherein the continuous material comprises an optical fiber and the passing step comprises:

passing an optical fiber over the surface of a roller made from a material comprising an alumina matrix having silicon carbide whiskers dispersed therein.

* * * * *